(12) United States Patent
Kramer et al.

(10) Patent No.: US 7,380,992 B2
(45) Date of Patent: Jun. 3, 2008

(54) HYBRID ADAPTER

(75) Inventors: Anne Kramer, Berlin (DE);
Hans-Joachim Faika, Berlin (DE);
Jorg Adomeit, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 11/251,009

(22) Filed: Oct. 11, 2005

(65) Prior Publication Data

US 2006/0083467 A1   Apr. 20, 2006

(30) Foreign Application Priority Data

Oct. 12, 2004   (DE) .................. 10 2004 049 697

(51) Int. Cl.
*G02B 6/36* (2006.01)
(52) U.S. Cl. .................. 385/60; 385/72; 385/75; 385/78
(58) Field of Classification Search .......... 385/53, 385/55, 60, 70, 72, 75, 78, 139
See application file for complete search history.

(56) References Cited

U.S. PATENT DOCUMENTS

| 5,274,729 A | 12/1993 | King et al. |
| 5,317,663 A | 5/1994 | Beard et al. |
| 5,883,995 A | 3/1999 | Lu |
| 6,164,835 A | 12/2000 | Imasaki |
| 6,273,619 B1 | 8/2001 | Shahid et al. |
| 6,347,888 B1 | 2/2002 | Puetz |
| 6,872,008 B2 * | 3/2005 | Takeda et al. ................. 385/60 |
| 2003/0147597 A1 * | 8/2003 | Duran .......................... 385/76 |

FOREIGN PATENT DOCUMENTS

| CA | 2455258 | 3/2003 |
| DE | 101 41 449 | 3/2003 |
| DE | 699 06 230 | 12/2003 |
| EP | 1 099 967 A2 | 5/2001 |
| EP | 1 273 943 | 1/2003 |

OTHER PUBLICATIONS

Office Action mailed Aug. 21, 2007 from co-pending U.S. Appl. No. 11/789,896, filed Apr. 26, 2007, and which is a child of the pending case.

* cited by examiner

*Primary Examiner*—Frank G. Font
*Assistant Examiner*—Michael Mooney
(74) *Attorney, Agent, or Firm*—Merchant & Gould P.C.

(57) ABSTRACT

A universal hybrid adapter includes a first housing part, a second housing part, and a sleeve. The first housing part has a receptacle end configured to receive a plug connector including a ferrule having a first diameter. The second housing part has a receptacle end configured to receive a plug connector including a ferrule having a second diameter different from the first diameter. A first end of the sleeve is configured to receive the ferrule having the first diameter and a second end of the sleeve is configured to receive the ferrule having the second diameter. The transition from the first end to the second end of the sleeve takes place at right angles.

7 Claims, 6 Drawing Sheets

HYBRID ADAPTER

TECHNICAL FIELD

The invention relates to a hybrid adapter for fiberglass plug connectors.

BACKGROUND

Known fiberglass plug connectors can be split into two groups, namely standard connectors having a ferrule diameter of 2.5 mm and small form factor connectors having a ferrule diameter of 1.25 mm. In this case, there are different types in each group. Standard connectors are, for example, plug connectors of the type ST, FC or SC. Small form factor connectors are, for example, the types LX.5, LC or MU.

The term adapter is in this case used when two different types in one group are intended to be connected to one another, whereas hybrid adapters connect plug connectors from different groups.

U.S. Pat. No. 5,274,729 discloses an adapter for standard connectors by means of which the different types ST, FC and SC can be connected to one another.

DE 101 41 449 A1 discloses a universal adapter for the group of small form factor connectors. In this case, an embodiment is disclosed in which the adapter is composed of two symmetrical housing halves which each define a receptacle for a plug connector. In this case, the housing halves are designed such that they are each suitable for receiving all of the three types LX.5, LC or MU. In the interior of the housing halves is arranged a sleeve which receives the ferrules of the two plug connectors to be connected. LX.5 plug connectors have a ferrule which protrudes from the housing of the plug connector and is shorter than that for LC or MU plug connectors, with the result that the housing half is formed with a pin which, during an insertion procedure, moves a laser light flap away such that the ferrule is not damaged.

DE 699 06 230 T2 discloses a hybrid adapter, by means of which it is possible to receive plug connectors from different groups. The hybrid adapter comprises an alignment sleeve for axially aligning ferrules, having a support element which defines an essentially central hole through said support element, the hole comprising a first section and a second section. The first and the second section are aligned in the longitudinal direction and are located close to one another, the inner surface of the hole tapering increasingly at a predetermined angle of less than approximately 5 degrees. The support element comprises a first inner wall which at least partially defines the first section, the first inner wall comprising a plurality of first contact points which are spaced apart from one another symmetrically over the first inner wall, the first contact points being dimensioned in order to receive a first ferrule of a first diameter which has no tapering. The support element comprises a second inner wall which at least partially defines the second section, the second inner wall comprising a plurality of second contact points which are spaced apart from one another symmetrically over the second inner wall, the second contact points being dimensioned in order to receive a second ferrule of a second diameter which is not the same as the first diameter and likewise has no tapering.

One disadvantage of the known hybrid adapter is the fact that it is not suitable for receiving LX.5 plug connectors.

SUMMARY

The invention is therefore based on the technical problem of providing a universal hybrid adapter and a sleeve suitable therefor, by means of which it is also possible to connect LX.5 plug connectors to standard connectors.

For this purpose, the sleeve is of stepped design. The transition from the first diameter to the second diameter takes place at a right angle. The sleeve has an axially continuous slot. The right-angled transition ensures that it is possible for the ferrule having the smaller diameter to be inserted at least up to the transition, but preferably even as far as into the region of the larger diameter. Even in the case of short ferrules of LX.5 plug connectors, this ensures that the ferrules can be brought together edge to edge. Owing to the continuous slot, it is in this case possible for the sleeve to compensate for manufacturing tolerances of the sleeve itself and of the ferrules. Since the ferrules can be reliably brought together edge to edge, they may have both a UPC (Ultra Polishing Contact) ground surface and an APC (Angle Polishing Contact) ground surface. The former is a planar-parallel ground surface, and the latter is a ground surface at an angle of 8° or 9° in order to deflect reflections at the coupling point.

In one preferred embodiment, the length of the section of the sleeve having the first smaller diameter is smaller than the length having the larger diameter. This increasingly ensures that the ferrule having the smaller diameter is inserted in the region of the sleeve having the larger diameter, with the result that better contact is made. The ratio is preferably at least 2:3, further preferably the ratio being selected to be in the region of 1:3.

Further preferably, the sleeve is made of ceramic, bronze or plastic, ceramic being particularly preferred.

In one further preferred embodiment, the first housing part is formed with an integrated laser protection flap, whose preferably spring-loaded flap is automatically pushed against the housing wall without coming into contact with the ferrule when a plug connector is inserted.

In one further preferred embodiment, the first housing part is in the form of a universal adapter for small form factor connectors, reference being made as regards a preferred embodiment to DE 101 41 449 A1, express reference hereby being made to said disclosure.

In this case, a housing half of the adapter described there is thus used as the universal interface for the small form factor connectors.

In one further preferred embodiment, the second housing part has an opening for the purpose of receiving FC and ST plug connectors, it being possible for an FC or ST interface, which is preferably made of metal, to be inserted in said opening.

In one further preferred embodiment, the FC or ST interface is provided with a radial groove, into which a sprung, forked metal sheet can be plugged on from the front side of a front panel. By this means, the interface can be selected to be very short, and the adapter can be detached simply and rapidly from the front side.

In one further preferred embodiment, the second housing part has a separate sleeve receptacle for the purpose of receiving an SC plug connector, it being possible for said sleeve receptacle to be latched to the first and second housing parts.

In one further preferred embodiment, a front frame having an integrated laser protection flap is latched onto the second housing part.

The second housing part for the SC plug connector is preferably fixed to a front panel by means of two lateral spring clips.

The invention will be explained in more detail below with reference to a preferred exemplary embodiment. In the figures:

DETAILED DESCRIPTION

Figure 1:
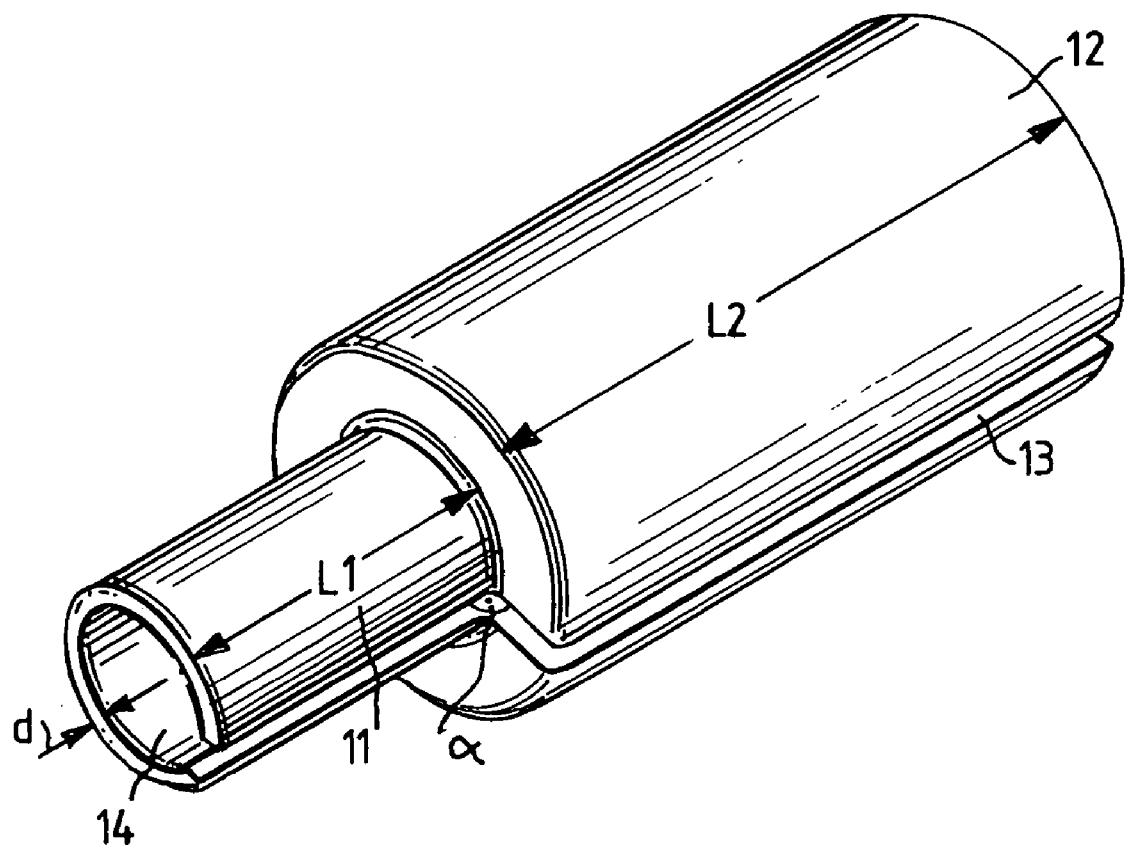
FIG. 1 shows a perspective illustration of the sleeve.

FIG. 1 shows a sleeve 10 for receiving ferrules having different diameters. The sleeve 10 in this case has two cylindrical sections 11 and 12, the transition between the two sections 11, 12 taking place in a stepped manner at a right angle α. The thickness d of the sleeve 10 is in this case constant in both sections 11, 12. Furthermore, the sleeve 10 has an axially continuous slot 13. The length L1 of the first section 11 is in this case smaller than the length L2 of the second section 12. The end face 14 in this case has an opening for a ferrule having a small diameter, and the opposite end face (not visible) has an opening for a ferrule having a larger diameter.

Figure 2:
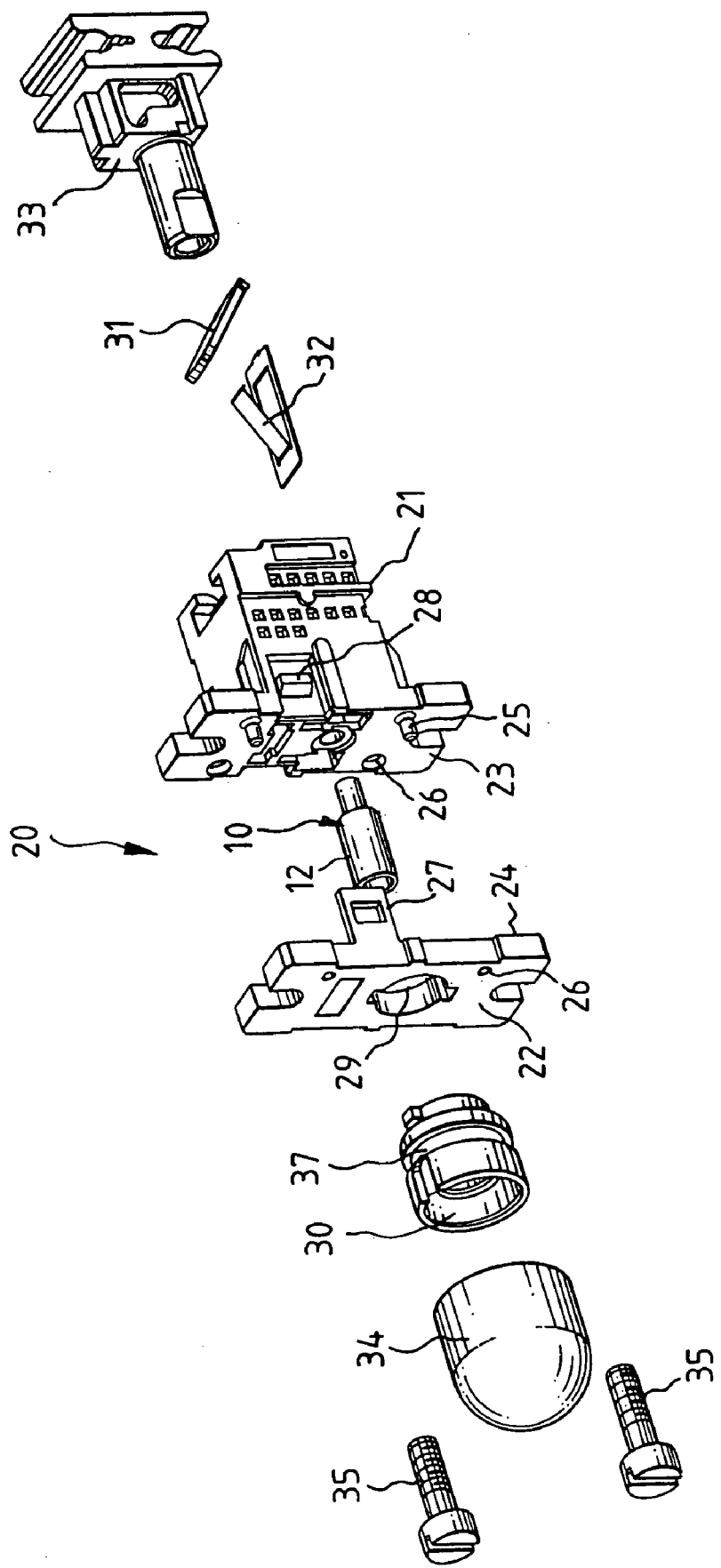
FIG. 2 shows an exploded illustration of a universal hybrid adapter for receiving an FC plug connector.
Figure 5:
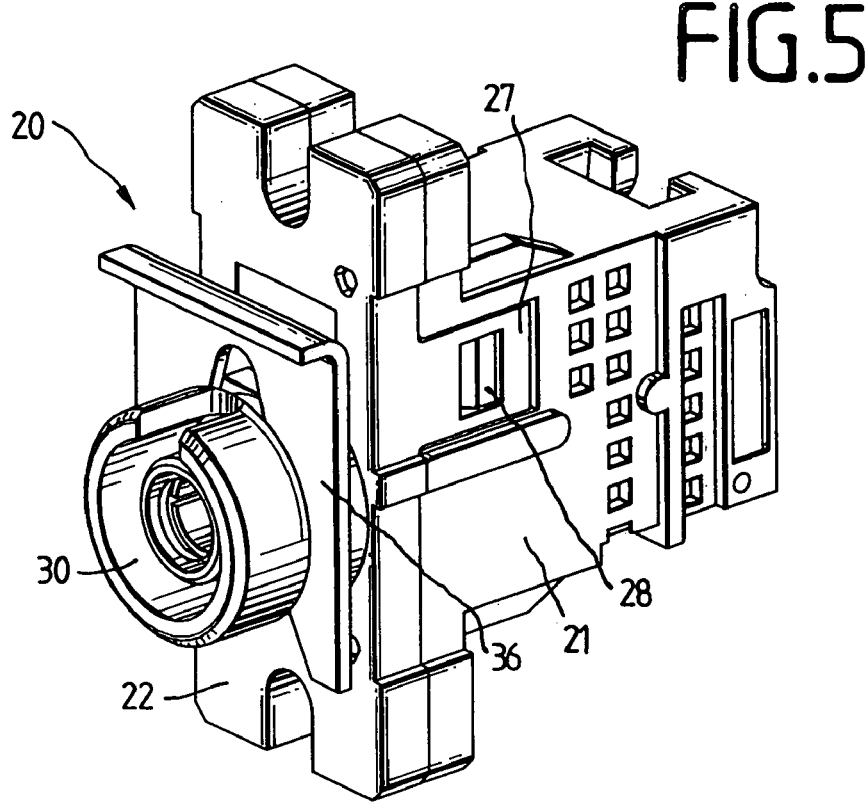
FIG. 5 shows a universal hybrid adapter for receiving an FC plug connector when assembled.

FIG. 2 shows an exploded illustration of a universal hybrid adapter 20 for an FC plug connector. The universal hybrid adapter 20 comprises a first housing part 21, which is designed such that it can receive all known small form factor connectors LX.5, LC or MU plug connectors. Furthermore, the universal hybrid adapter 20 comprises a second housing part 22. The first and second housing parts 21, 22 each have a flange 23, 24, on which are arranged latching pins 25 or latching holes 26, the latching pins 25 of one flange corresponding to the latching holes 26 of the other flange, and vice versa. Furthermore, the second housing part 22 has two latching brackets 27 which latch into a respective latching recess 28 in the first housing part 21. By means of the latching pins 25, latching holes 26, latching brackets 27 and latching recesses 28, the two housing parts 21, 22 can be latched fixedly to one another, the sleeve 10 being shown between the two housing parts 21, 22 and being guided, when assembled, in the first housing part 21. The second housing part 22 has an opening 29, through which the region 12 of the sleeve 10 protrudes. On the other side of the housing part 22 is arranged an FC interface 30 which is inserted through the opening 29 and receives the region 12 of the sleeve 10. The first housing part 21 is formed with an integrated laser protection flap 31 which is loaded with a spring 32. Furthermore, a dust protection cap 33 for the first housing part 21 and a dust protection cap 34 for the second housing part 22 are illustrated in FIG. 2. The dust protection caps 33, 34 in this case are only used if no plug connector is inserted in the adapter 20. Furthermore, two fixing screws 35 are illustrated, by means of which the universal hybrid adapter 20 is screwed to a front panel (not shown), the fixing screws 35 being passed through the arched depressions in the upper and lower ends of the flanges 23, 24. The assembled state without dust protection caps is shown in FIG. 5, a sprung, forked metal sheet 36 being used instead of the fixing screws 35 for fixing it to a front panel and being pushed into a groove 37 (see FIG. 2) and fixedly clamping the universal hybrid adapter 20 to the front panel (not shown). The front panel is in this case located between the forked metal sheet 36 and the second housing part 22.

Figure 3:
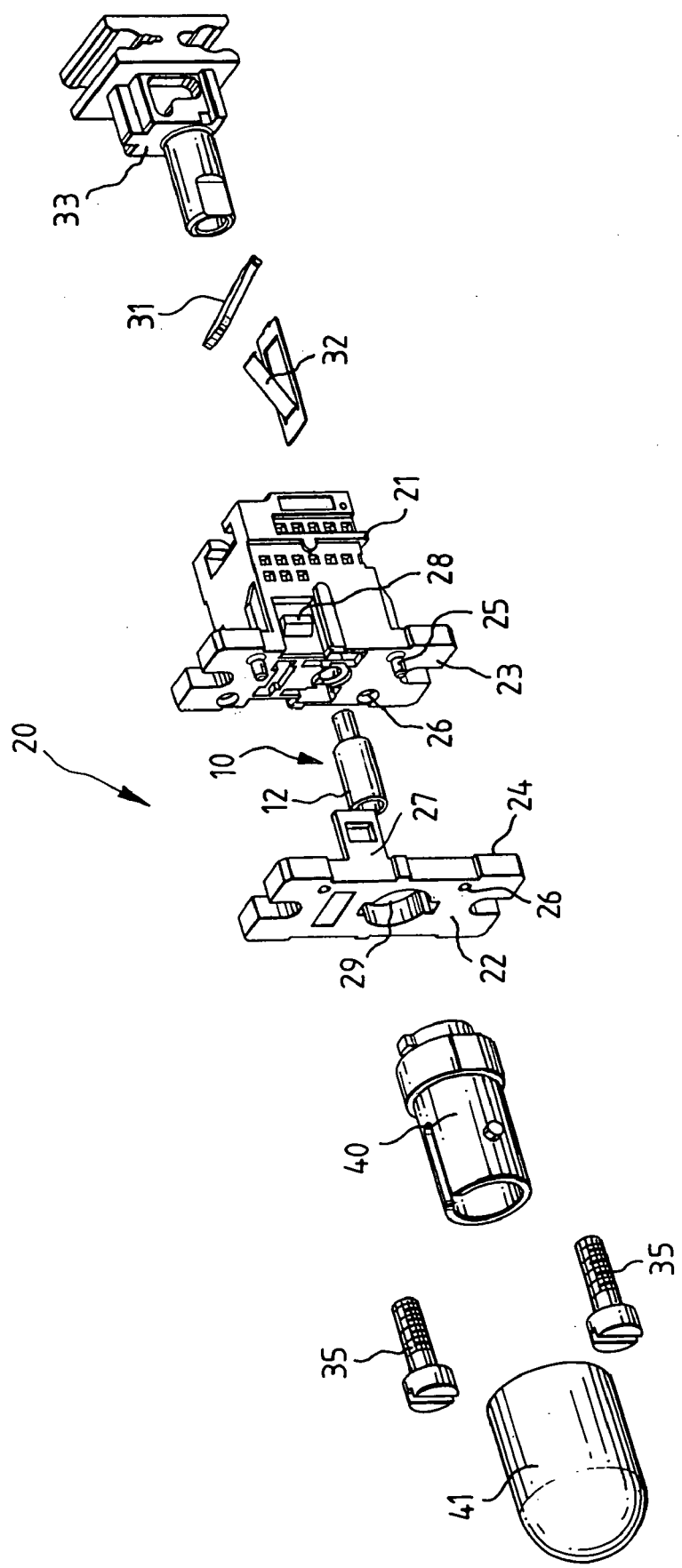
FIG. 3 shows an exploded illustration of the universal hybrid adapter for receiving an ST plug connector.

FIG. 3 shows an exploded illustration of the universal hybrid adapter 20 for an ST plug connector, identical components to those in FIG. 2 being provided with the same reference numerals. The only difference from the FC plug connector is the ST interface 40 and the dust protection cap 41 which is matched to the geometry of the ST interface 40. Otherwise, reference may be made in full to the explanations for FIG. 2. The ST interface 40 may in this case, like the FC interface 30, be formed with a groove for receiving a sprung, forked metal sheet. The assembled universal hybrid adapter 20 having an ST interface 40 is shown in FIG. 7.

Figure 4:
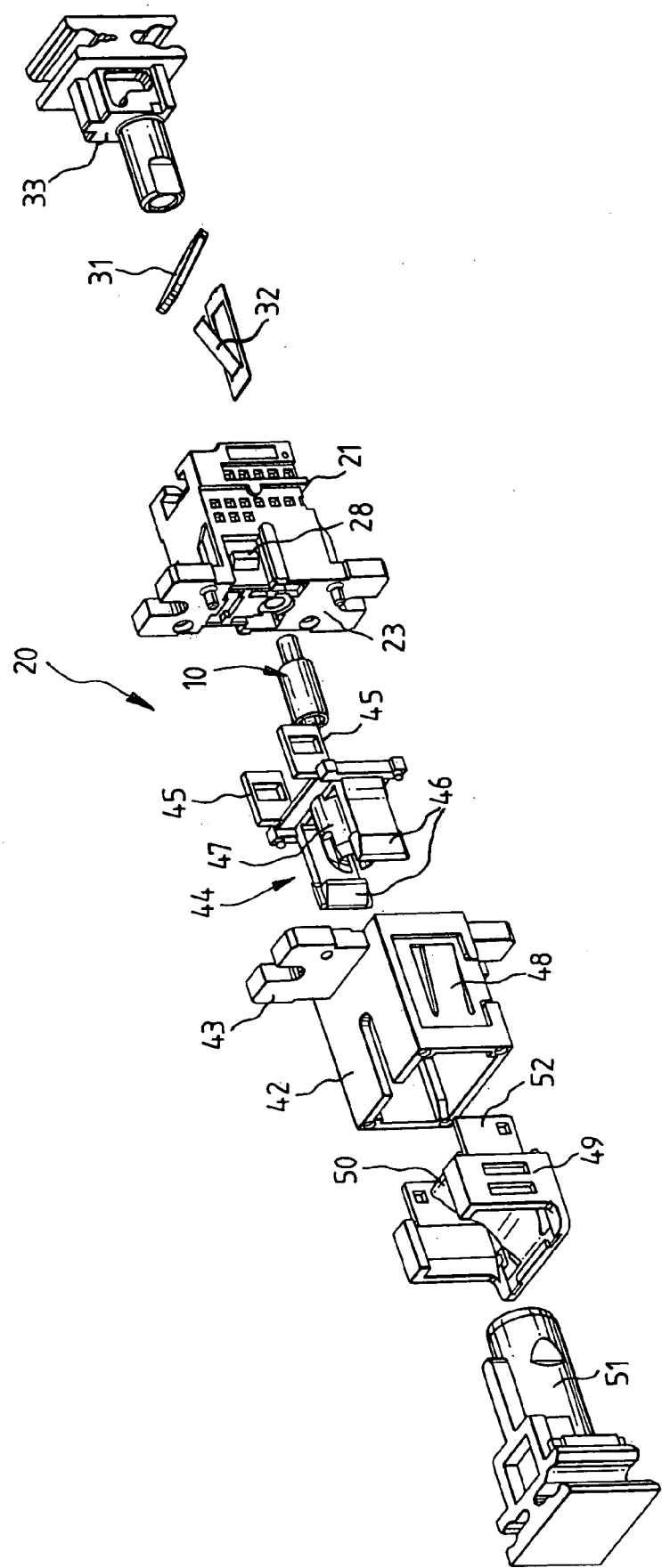
FIG. 4 shows an exploded illustration of the universal hybrid adapter for receiving an SC plug connector.
Figure 6:
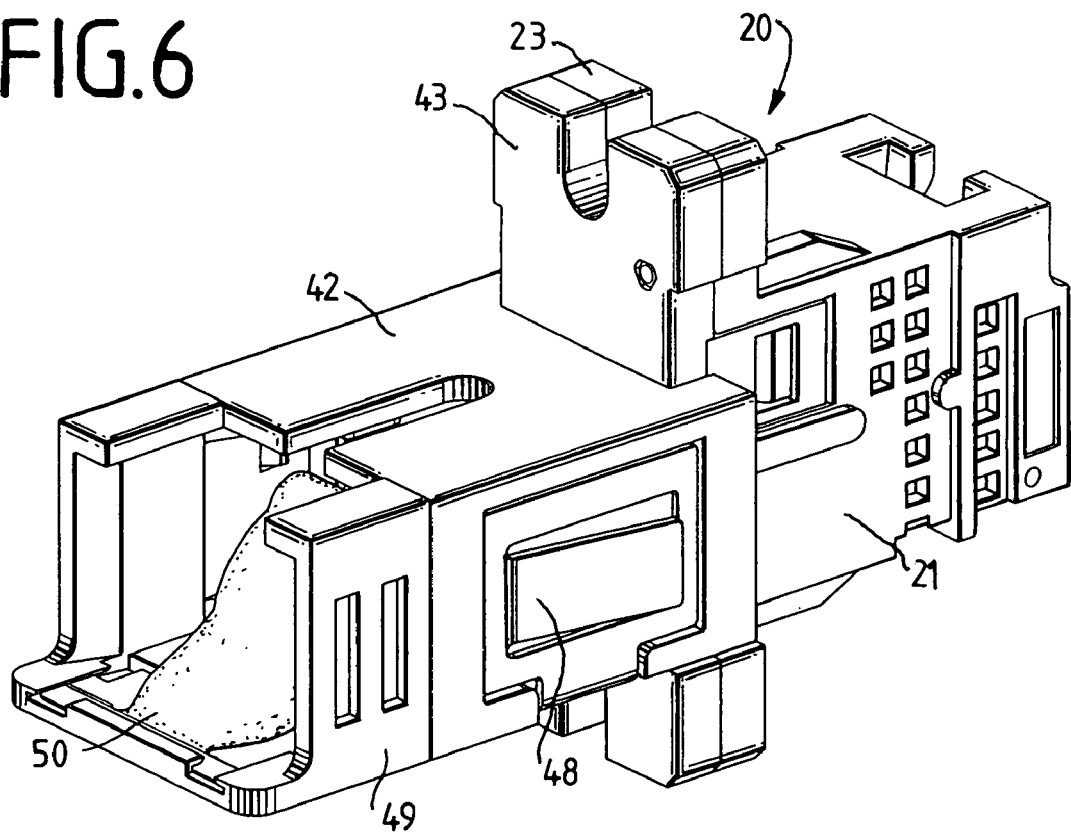
FIG. 6 shows a universal hybrid adapter for receiving an SC plug connector when assembled.

FIG. 4 then shows an exploded illustration of the universal hybrid adapter 20 for receiving SC plug connectors. In this case, the right-hand part including the sleeve 10 corresponds to the preceding exemplary embodiments. The second housing part 42, however, is in the form of a square having flanges 43. In this case, the flanges 23 and 43 are fixed in a similar manner to in the preceding embodiments. Owing to the shape of the second housing part 42, there would be no guidance for the sleeve 10. A separate sleeve receptacle 44 is thus provided. The sleeve receptacle 44 is formed with two latching brackets 45 which latch into inner latching recesses in the first housing part 21 and two latching brackets 46 which latch into the second housing part 42. Furthermore, the sleeve receptacle 44 has a cylindrical attachment 47, in which the section 12 of the sleeve 10 is guided. Arranged on the sides of the second housing part 42 are spring clips 48, by means of which the universal hybrid adapter 20 can be fixed to a front panel. Latched onto the front side of the second housing part 42 is a front frame 49 having an integrated laser flap 50. Furthermore, a dust protection cap 51 is illustrated. For latching purposes, the front frame 49 is formed with two latching brackets 52. The assembled state is in this case illustrated in FIG. 6.

Figure 7:
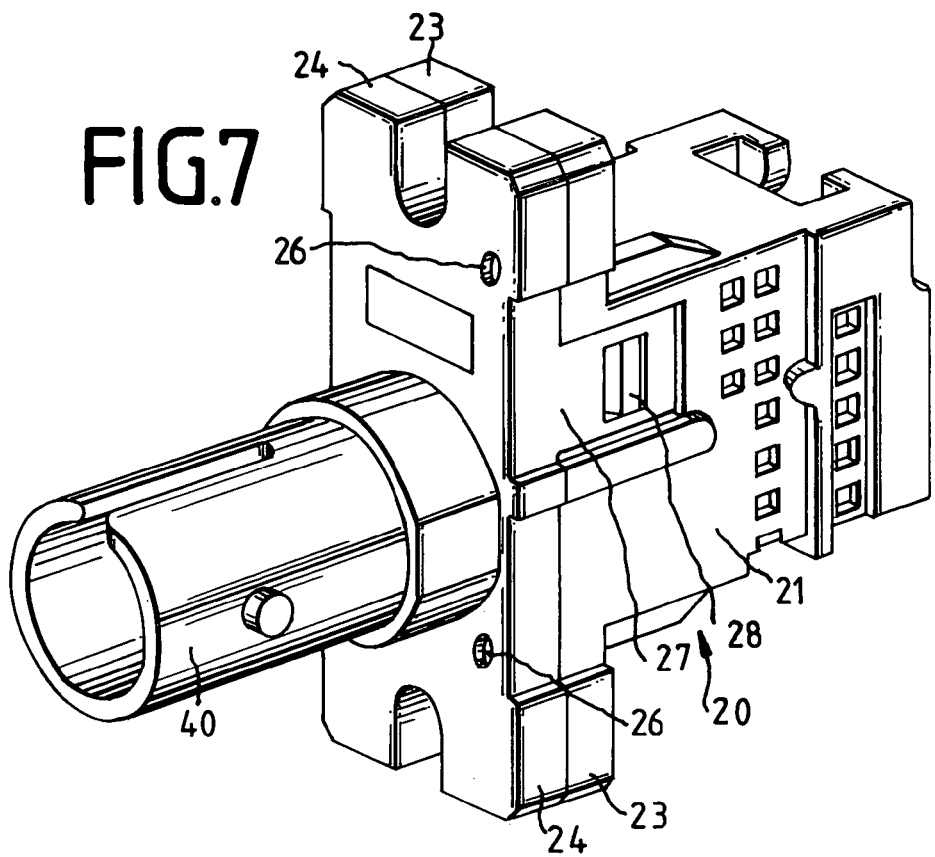
FIG. 7 shows a universal hybrid adapter for receiving an ST plug connector when assembled.
Figure 8:
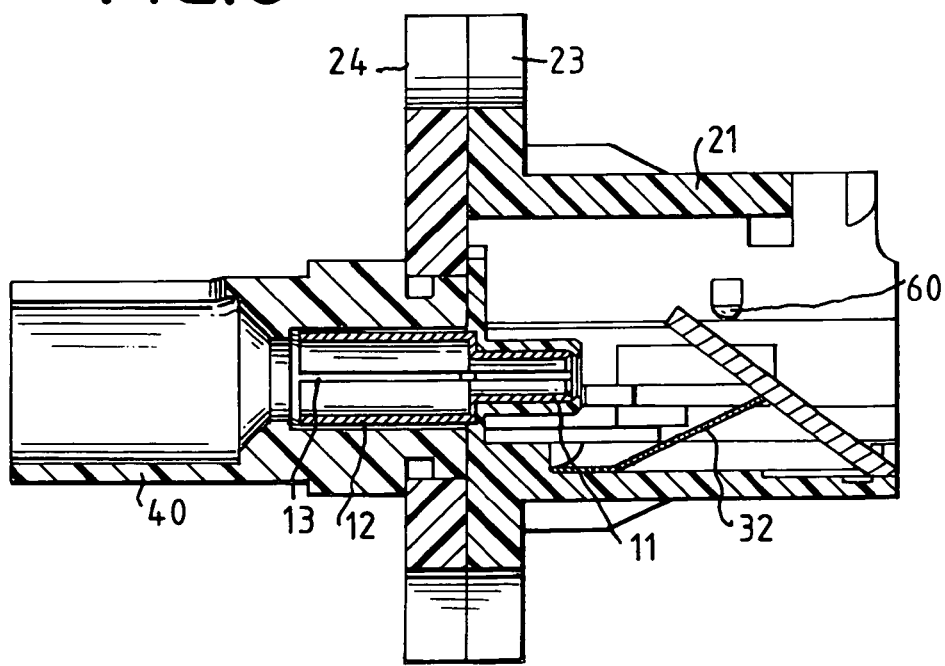
FIG. 8 shows a sectional illustration through the adapter shown in FIG. 7.

FIG. 8 shows a sectional illustration of the universal hybrid adapter 20 shown in FIG. 7. In this case, it is particularly easy to recognize the right-angled transition between the sections 11 and 12 of the sleeve 10. Furthermore, a flap pin 60 can be seen which serves the purpose of opening the laser protection flap 31 when an LX.5 plug connector is inserted.

LIST OF REFERENCE NUMERALS 10 sleeve
11 cylindrical section
12 cylindrical section
13 slot
14 end face
20 universal hybrid adapter
21 first housing part
22 second housing part
23 flange
24 flange
25 latching pins 26 latching holes
27 latching bracket
28 latching recess
29 opening
30 FC interface
31 laser protection flap
32 spring
33 dust protection cap
34 dust protection cap
35 fixing screws
36 forked metal sheet
37 groove
40 ST interface
41 dust protection cap
42 second housing part
43 flange
44 sleeve receptacle
45 latching bracket
46 latching bracket
47 cylindrical attachment
48 spring clips
49 front frame
50 laser flap
51 dust protection cap
52 latching bracket
60 flap pin
L1 length
L2 length
d thickness
∀ right angle

The invention claimed is:

1. A universal hybrid adapter, comprising a first housing part and a second housing part, the first housing part defining a receptacle for a plug connector having a ferrule having a first diameter, and the second housing part defining a receptacle for a plug connector having a ferrule having a second diameter, the first and second diameters of the ferrules being different, at least the first housing part having a receptacle for a sleeve, the sleeve having a diameter, on the end face facing the first housing part, which is matched to the diameter of the ferrule having a first diameter, and having a diameter, on the end face facing the second housing part, which is matched to the diameter of the ferrule having the second diameter, wherein the sleeve is of stepped design, the transition from the first diameter to the second diameter taking place at a right angle, the sleeve having an axially continuous slot;

wherein the second housing part has an opening for the purpose of receiving FC and ST plug connectors, it being possible for an FC or ST interface to be inserted in said opening; and wherein the interface has a radial groove, into which a sprung, forked metal sheet can be plugged on from the front side of a front panel.

2. The universal hybrid adapter as claimed in claim 1, wherein the length of the section of the sleeve having the first diameter is smaller than the length having the second diameter.

3. The universal hybrid adapter as claimed in claim 2, wherein the ratio of the lengths is at least 2:3.

4. The universal hybrid adapter as claimed in claim 1, wherein the sleeve is made of ceramic, bronze or plastic.

5. The universal hybrid adapter as claimed in claim 1, wherein the first housing part is formed with an integrated laser protection flap.

6. The universal hybrid adapter as claimed in claim 1, wherein the first housing part is in the form of a universal adapter for small form factor connectors.

7. The universal hybrid adapter as claimed in claim 1, wherein the FC or ST interface is made of metal.

* * * * *